2,765,353

CHLORINATION OF OLEFINS

Clarence M. Neher, Baton Rouge, La., assignor to Ethyl Corporation, New York, N. Y., a corporation of Delaware No Drawing. Application May 19, 1954,
Serial No. 430,969

2 Claims. (Cl. 260—660)

This invention relates to the manufacture of halogenated hydrocarbons. More particularly, the invention relates to reducing corrosion of ferrous equipment in chemical processes wherein an excess of free chlorine reactant is present concurrently in an agitated halogenated olefin reaction medium.

A typical operation in which the present process is necessitated is the addition halogenation of an olefin by a so-called mixed phase technique, to form a dihaloalkane. In carrying out such a process, a gaseous halogen and a gaseous olefin are normally fed separately, but at adjacent points, to the base of a reactor containing a reservoir supply of the liquid product of the reaction. This liquid supply, commonly designated as reactor solution, functions as a reaction medium or contact agent, providing intimate contact of the olefin and halogen feeds. The feeds or reactants bubble up through the reactor solution and combine to form the desired olefin halide product. The heat liberated by the reaction is absorbed by the reactor solution, the temperature of which is maintained at the desired operating level by forced or natural circulation through external heat exchangers.

The above process has been widely and successfully applied in producing numerous olefin halides. For example, ethylene chloride, ethylene bromide, propylene chloride, propylene bromide, 1, 2- and 2, 3-dichlorobutane are typical products of the process. In commercial operations, although such products are made with efficient utilization of the reactant components, considerable difficulty has been experienced owing to excessive corrosion occurring in the reaction vessel and in supplementary process equipment. In particular, corrosion has been found to be particularly severe in product delivery lines, in heat exchangers, and especially at points at which the reaction mixture impinges on or flows past a metal surface with appreciable velocity. A substantial amount of heat transfer equipment is essential in commercial operations to remove the heat generated by the exothermic reaction and maintain the reactor solution at the preferred operating temperatures. Such heat exchangers have been found to be particularly susceptible to corrosion attack. The corrosion tendency of such processes is therefore frequently a cause of great expense and in addition necessitates frequent shutdowns which result in production loss and an increase in process cost. In these operations, a uniform condition is the presence of a small amount of free, dissolved halogen in the reaction medium which is believed to be responsible for the rapid deterioration of the steel equipment desirably used.

The object of my invention is to provide an improved process in which the corrosion tendency is substantially negated. A further object is to prevent the corrosion of heat exchangers, agitators or other portions of the equipment for the addition halogenation of alkenes, particularly if exposed to impingement by or contact with moving streams of the reactor solution. A further object is to provide a heterogeneous liquid reaction system for halogenation operations which is substantially neutral and non-corrosive to steel equipment for processing.

I have discovered that a minute quantity of sulfuric acid distributed in the reactor solution accomplishes the above and other objects. According to my invention, liquid sulfuric acid, preferably in the proportion of from 0.5 to 5.0 parts per 100 parts by weight of the reactor solution, is distributed through the solution. The sulfuric acid is distributed or added by various means to be described hereafter.

The benefits of my improved process will be more fully understood from the description and examples given hereafter. The following examples show the improvement effected with respect to minimizing corrosion of mild steel in contact with the reactor solution of an ethylene chloride process.

Example I

A quantity of reactor solution consisting principally of ethylene chloride was introduced to an exposure or contact vessel designed to duplicate the exposure conditions existent in the reactor and at other points of an ethylene chloride plant. The vessel was a completely enclosed cylindrical vessel, constructed of resin bonded graphitic material. Provision was made for suspending stationary bar samples of metal in the reactor solution. In addition, the vessel was fitted with a vertically aligned stirrer shaft, to the immersed end of which could be attached a bar specimen of the metal for which the corrosion rate was to be determined. A glass inlet tube, discharging below the level of the solution, provided means for addition to the reactor solution of gaseous components which are present in an operating plant.

Bar samples of mild steel were inserted in stationary position in the solution, and an additional bar sample was attached to the immersed end of the stirrer above described.

The solution was maintained at a temperature of 50° C., and the stirrer was rotated at a speed providing a peripheral velocity, of the attached bar steel specimen, of 13 feet per second. A small amount of chlorine gas was continuously bubbled through the reactor solution throughout the run, which was continued for 41 hours. The reactor solution contained the following components dissolved in the ethylene chloride, concentrations being given in weight percent: Water, 0.18; ferric chloride, 0.05; and chlorine, 0.16. Upon completion of the run, both the stationary and rotated steel specimens were removed and carefully dried in an inert atmosphere. The bars were then weighed, the loss in weight showing an average corrosion rate of approximately 0.25 inch per year for both the stationary and moving specimens.

It is apparent from the foregoing typical experience that mild steel reaction vessels and other process equipment would rapidly deteriorate under the service conditions described above. It should be emphasized that the corrosion rate of approximately one-fourth inch per year represents only an average calculated metal disappearance rate. It is well known that corrosion does not occur uniformly, so that it will be readily understood that in the above example the test specimens exhibited localized points of corrosion loss substantially in excess of the average rate cited. This was particularly true with respect to the rotating specimen, which was particularly corroded at the ends where the movement through the reactor solution was most rapid.

The foregoing example illustrates the corrosion rate which is experienced at relatively mild conditions, that is, with only minor quantities of the major corrodant material, free chlorine, in reactor solution. It has been found that greater amounts of free chlorine will result in more drastic corrosion, especially when there is a larger amount of free water present. The following example illustrates the higher corrosion rate experienced at higher concentrations of free chlorine.

*Example II*

The procedure of Example I was repeated, except that the concentration of water and free chlorine in the reactor solution were 0.11 and 0.37 weight percent, respectively. Upon the termination of the test, the average corrosion rates were 0.69 and 0.62 inches, respectively per year.

The foregoing controlled condition tests illustrate quantitatively the average corrosion rates which are normally encountered in addition halogenation operations. The following example illustrates the manner in which this corroding effect will limit industrial operations.

*Example III*

A concentrated ethylene containing gas and a chlorine gas stream are separately fed to the bottom of a halogenation reactor. The reactor, a vertical cylindrical drum, is approximately three-fourths full of a liquid reaction medium comprising ethylene dichloride, but containing on the average, about 0.2 weight percent dissolved chlorine, and dissolved water at less than 0.1 weight percent concentration.

In passing up through the solution, the feed chlorine and ethylene combine to form additional ethylene dichloride, but the free chlorine content remains substantially the same. No agitation is provided except by the vigorous upward bubbling of the reacting gases. A side stream of the reaction medium is withdrawn near the top of the system and circulated through a heat exchanger for cooling and removal of the heat of reaction. Using a shell and tube exchanger having one-inch tubes with a wall gage of 10 (Birmingham Wire Gage; equal to 0.134 inch) the service life before tube failure will not normally exceed 3 months, or 6 months in unusual situations.

It is apparent from these results that process equipment has an extremely limited life, particularly if the operating conditions are such that substantial amounts of free chlorine exist within the reaction mixture. Under the preferred operating conditions in an ethylene chloride reactor, there is little if any free chlorine dissolved in the reactor solution. However, occasionally even under the best conditions, various operating disturbances will result in feed of an appreciable excess of chlorine, that is, over and above the quantity which will react with the ethylene fed. Such excess chlorine results in a corresponding aggravation of corrosion, which persists as long as appreciable amounts of free chlorine are present. Such periods of surplus chlorine feed can be caused by a number of factors. For example, in plants which utilize a dilute ethylene feed, undetected decreases in the ethylene concentration in the ethylene feed stream will result in excess chlorine until the ethylene stream feed rate is adjusted. It is also often difficult to maintain a precise ratio of two gas streams for an extended period. Thus, frequently known operating deficiencies result in the creation of severe corrosion conditions.

As already stated, it has now been discovered that a minute quantity of sulfuric acid distributed in the reactor solution virtually negates the above described corrosion effects. The following examples show the high degree of effectiveness of operating according to the improved method.

*Example IV*

The procedure of Example I was repeated, except that to the reactor solution was added a small amount of concentrated sulfuric acid, in the proportion of 2 weight percent of the reactor solution. The water and free chlorine concentrations in the reactor solution were 0.055 and 0.22 weight percent, respectively.

Upon completion of 41 hours exposure of the stationary and moving mild steel specimens, the weight losses thereof amounted to corrosion rates of 0.025 and 0.02 inch per year for the stationary and moving specimens respectively. It will be seen that the sulfuric acid present accomplished a reduction of the corrosion rates to only about 10 percent of that encountered in Example I, and to less than .4 percent of that encountered in Example II. The improved process therefore provides an increase in corrosion resistance by a factor of the order of 10 to 25 times that obtainable heretofore at the corrosive conditions described.

To illustrate the application of these findings to commercial operations, the following example describes the improved service life attainable in commercial operations.

*Example V*

The operation described in Example III is repeated, except that a quantity of concentrated sulfuric acid, of 96–98 percent strength, is charged to the reaction mixture, forming a heterogeneous liquid reaction medium, the sulfuric acid amounting to about 2 weight percent of the reaction medium. In operation, the high degree of agitation supplied by the flow of the reacting gases results in dispersion of the major portion of this acid through the reaction medium as small droplets.

Under these conditions, the service life of the heat exchanger tubes is increased to about 5 or 6 years. Comparable increase in the service life of the reaction vessel proper is obtained.

Numerous specific means are of course available for supplying and distributing the sulfuric acid utilized in the process. In general, it is preferred that the acid be added through a separate feed system at the top of the reactor. As sulfuric acid is appreciably more dense than the olefin halides of the reactor solution, the acid so added will slowly settle toward the bottom of the reaction vessel. The agitation of the system by upward passage of the reaction components provides the desired distribution of the sulfuric acid in a reaction mixture. Other means can of course be utilized for the purpose of feeding fresh sulfuric acid or for distributing the acid in the reaction mixture. Thus, the chlorine feed may be introduced as a jet below the level of a small pool of sulfuric acid maintained at the bottom of the reactor. The jet velocity can be regulated to provide the appropriate distribution of the sulfuric acid as small droplets in the reactor solution.

It is unnecessary to continuously provide a stream of sulfuric acid. An initial addition of the necessary quantity provides corrosion protection for an extended period as demonstrated by the foregoing examples. In general, however, it is preferred to add a fresh amount of sulfuric acid daily. It has been found that the sulfuric acid is slowly deactivated, principally by the absorption of water or other impurities in the reaction mixture. The addition of a fresh supply of sulfuric acid, and removal of deactivated or spent acid, at intervals of approximately 24 hours, insures that the corrosion protection desired will be continuous.

The spent sulfuric acid can be collected for removal from the system by means well known in the art. A convenient means is to provide a settling vessel in the product discharge line from the reactor. The sulfuric acid droplets will coalesce into a continuous liquid phase at the bottom of such a collection vessel and can be either recycled to the reactor or discharged from the system as necessary. In general, the amounts of spent sulfuric acid discharged and concentrated acid added should be such as to maintain the concentration thereof at least at 70 weight percent.

As heretofore stated, the amount of sulfuric acid to be maintained in the reactor solution will vary with the severity of the corrosion tendency. In general, a concentration of from 0.5 to 5 parts of concentrated sulfuric per 100 parts of solution is the preferred range and will provide corrosion prevention in substantially all instances.

This application is a continuation in part of my application Serial No. 193,025, filed October 30, 1950, now abandoned.

Having fully described my improved process and the manner of working it, what I desire to claim by Letters Patent is:

1. The method of reducing the corrosion of steel equipment in which dissolved free chlorine is present in an agitated liquid reaction medium, consisting essentially of olefin dichloride, for the mixed-phase addition chlorination of a gaseous olefin with gaseous chlorine, comprising distributing concentrated sulfuric acid, of at least 70 percent concentration, within said olefin dichloride in the proportions of from 0.5 to 5.0 parts by weight of concentrated sulfuric acid per 100 parts of olefin dichloride.

2. In a process for preparing normally liquid olefin dichlorides by introducing gaseous chlorine and a gaseous olefin into a reaction medium consisting essentially of liquid alkylene dichloride containing dissolved free chlorine, said reaction medium being held under agitated conditions in a steel reaction vessel, the improvement which includes adding to the reaction medium from 0.5 to 5 parts by weight of concentrated sulfuric acid per one hundred parts by weight of dichloride, to reduce the corrosion of the steel.

References Cited in the file of this patent
UNITED STATES PATENTS

| 1,492,391 | McQuaid et al. | Apr. 29, 1924 |

FOREIGN PATENTS

| 290,840 | Great Britain | May 24, 1928 |